US 12,043,335 B2

United States Patent
Hu

(10) Patent No.: US 12,043,335 B2
(45) Date of Patent: Jul. 23, 2024

(54) BICYCLE BELL

(71) Applicant: Yuan Wen Shing Industries Corp., Chang-Hua (TW)

(72) Inventor: Ching-Huang Hu, Chang-Hua (TW)

(73) Assignee: YUAN WEN SHING INDUSTRIES CORP., Chang-Hua (TW)

( * ) Notice: Subject to any disclaimer, the term of this patent is extended or adjusted under 35 U.S.C. 154(b) by 1024 days.

(21) Appl. No.: 16/985,182

(22) Filed: Aug. 4, 2020

(65) Prior Publication Data
US 2021/0206444 A1 Jul. 8, 2021

(30) Foreign Application Priority Data
Jan. 7, 2020 (TW) .................................. 109200219

(51) Int. Cl.
*B62J 3/04* (2020.01)
*G10K 1/07* (2006.01)

(52) U.S. Cl.
CPC . *B62J 3/04* (2020.02); *G10K 1/07* (2013.01)

(58) Field of Classification Search
CPC ................ B62J 3/04; G10K 1/07; G10K 1/10
See application file for complete search history.

(56) References Cited

U.S. PATENT DOCUMENTS

| | | | | |
|---|---|---|---|---|
| 616,015 A * | 12/1898 | Rockwell | ................... | B62J 3/04 |
| | | | | 116/159 |
| 6,125,785 A * | 10/2000 | Asheri | ................... | G10K 1/072 |
| | | | | 116/167 |
| 7,182,039 B2 * | 2/2007 | Ichimura | ................... | B62J 3/04 |
| | | | | 116/167 |
| D621,695 S * | 8/2010 | Van Solkema | ................ | D8/400 |
| D779,385 S * | 2/2017 | Shih | .............................. | D12/114 |
| 9,633,643 B1 * | 4/2017 | Bilanenko | .............. | B62K 23/06 |
| 11,772,732 B2 * | 10/2023 | Jau | .............................. | B62J 3/04 |
| | | | | 116/164 |
| 2010/0236469 A1 * | 9/2010 | Tsai | ......................... | G10K 1/072 |
| | | | | 116/167 |
| 2016/0111074 A1 * | 4/2016 | Lacy | ......................... | G10K 1/36 |
| | | | | 116/149 |

(Continued)

OTHER PUBLICATIONS

TW-M593962-U; Hu, "Bicycle Bell With Elastic Inlaid Buckle Bell Cover", Apr. 2020. (Year: 2020).*

(Continued)

*Primary Examiner* — John Fitzgerald
*Assistant Examiner* — Tania Courson
(74) *Attorney, Agent, or Firm* — Che-Yang Chen; Law Office of Michael Chen

(57) ABSTRACT

A bicycle bell includes a fixing seat on a pipe clamp, a bell cover, and an elastic support. The elastic support has two curved arms and a horizontal section. The two curved arms extend upward from two ends of the horizontal section. The two curved arms have engaging ends extending outwardly and laterally. The horizontal section is mounted to the fixing seat. The engaging ends are connected to the bell cover in a snap-on manner. In the bicycle bell, the fixing seat and the bell cover are assembled through the elastic support. The elastic support is a relatively flexible medium with poor energy conductivity, so that to the vibration amplitude of the bell cover is large, the energy loss is small, and the vibration is longer and louder.

4 Claims, 6 Drawing Sheets

(56) References Cited

U.S. PATENT DOCUMENTS

| | | | |
|---|---|---|---|
| 2017/0259868 A1* | 9/2017 | Hu | B62J 6/03 |
| 2020/0327874 A1* | 10/2020 | Slone | G10K 1/00 |
| 2022/0055705 A1* | 2/2022 | Sweet | H04R 1/026 |
| 2022/0081051 A1* | 3/2022 | Jau | B62J 3/04 |

OTHER PUBLICATIONS

KR-20170001068-U; 윤 세 형, "Bicycle Bell Cradle for Easy Tightening", Mar. 2017. (Year: 2017).*
CN-206155640-U; Lou, "Plate Bell", May 2017. (Year: 2017).*
DE-202020101436-U1; Pirner, "Bell and Handlebar Grip With a Bell", Mar. 2020. (Year: 2020).*

* cited by examiner

BICYCLE BELL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a bicycle bell, and more particularly to a bicycle bell having an elastic support connected between a fixing seat and a bell cover.

Description of Related Arts

Cycling is one of outdoor activities that combine health and leisure. Many people ride a bicycle as a means of transportation. In general, a bicycle is equipped with a brake lever, a bell, a speed change device, and other standard components. A bicycle bell is an indispensable component like a vehicle horn for warning. As shown in FIG. 1, a conventional bicycle bell comprises a fixing seat 10, a bell cover 12, a pipe clamp 14 having a screw 15, and a striker 18 having a spring 19. The fixing seat 10 is provided with a shaft tube 11 having a through hole 101. One side of the fixing seat 10 has a spring groove 102. A cover shaft 13 is riveted to the inner center portion of the bell cover 12. The cover shaft 13 is inserted into the through hole 101 of the shaft tube 11, so that the bell cover 12 is combined with the fixing seat 10. The pipe clamp 14 is arranged below the fixing seat 10. A shaft 16 having a hole 161 is provided above the pipe clamp 14. The shaft 16 is inserted into the through hole 101 of the shaft tube 11 from the bottom, so that the shaft 16 is clamped between the shaft tube 11 and the cover shaft 13. The pipe clamp 14 is sleeved onto a pipe 17 and fastened by the screw 15. The spring 19 is mounted in the spring groove 102 of the fixing seat 10. With the above structure, the striker 18 is pulled by the thumb to bend the spring 19 to generate a lateral return elastic force for the striker 18 to strike the bell cover 12 instantaneously. The bicycle bell vibrates and produces a warning sound to warn surrounding pedestrians and vehicles. However, the conventional bicycle bell still has the following shortcomings. The cover shaft 13 is riveted to the bell cover 12. For the cover shaft 13 to be combined with the bell cover 12 firmly, the cover shaft 13 must be pressed tightly, so the top of the bell cover 12 occupies a certain contact area between the shaft tube 11 and the cover shaft 13. The cover shaft 13 is generally made of hard solid metal and has excellent energy conductivity. The vibration generated by the striker 18 hitting the bell cover 12 will be directly conducted to the shaft tube 11 through the cover shaft 13, which reduces the amplitude and consumes the vibration energy quickly. As a result, the sound is not loud and short.

SUMMARY OF THE PRESENT INVENTION

The primary object of the present invention is to solve the above problems and to provide a bicycle bell. The bicycle bell includes a fixing seat and a bell cover that are assembled through an elastic support. The elastic support is a relatively flexible medium with poor energy conductivity, so that the vibration amplitude of the bell cover is large, the energy loss is small, and the vibration is longer and louder.

In order to achieve the above object, a bicycle bell is provided. The bicycle bell comprises a fixing seat on a pipe clamp, a bell cover, and an elastic support. The elastic support has two curved arms and a horizontal section. The two curved arms extend upward from two ends of the horizontal section. The two curved arms have engaging ends extending outwardly and laterally. The horizontal section is mounted to the fixing seat. The engaging ends are connected to the bell cover in a snap-on manner.

In an embodiment of the present invention, the fixing seat has a screw hole, the horizontal section is formed with a perforation, and a screw is inserted through the perforation and screwed to the screw hole.

In an embodiment of the present invention, two opposite sides of the fixing seat have raised walls, and the raised walls lean against two sides of the horizontal section, respectively.

In an embodiment of the present invention, the bell cover has an engaging hole passing through the bell cover, and the engaging ends are inserted from a bottom of the bell cover to be engaged with the engaging hole.

In an embodiment of the present invention, the bicycle bell further comprises a decorative plug. The decorative plug has a plug head with two elastic hooks. A top of the bell cover has a recess portion. The engaging hole is located in the recess portion. The elastic hooks are inserted from the top of the bell cover to be engaged with the engaging hole and interlaced with the engaging ends. The plug head is accommodated in the recess portion.

In the above-mentioned bicycle bell, the fixing seat and the bell cover are assembled through the elastic support. The elastic support is a relatively flexible medium with poor energy conductivity, so that the vibration amplitude of the bell cover is large, the energy loss is small, and the vibration is longer and louder.

DETAILED DESCRIPTION OF THE PREFERRED EMBODIMENT

Figure 1:
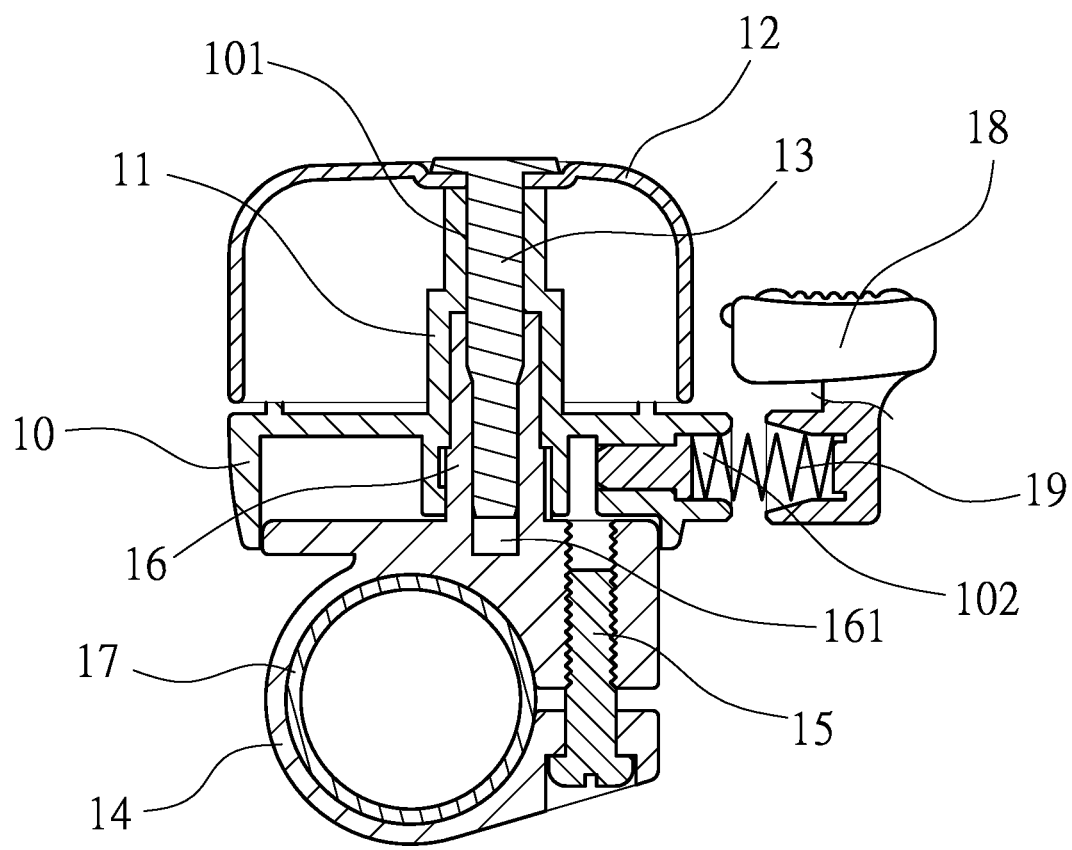
FIG. 1 is a cross-sectional view of a conventional bicycle bike.
Figure 2:
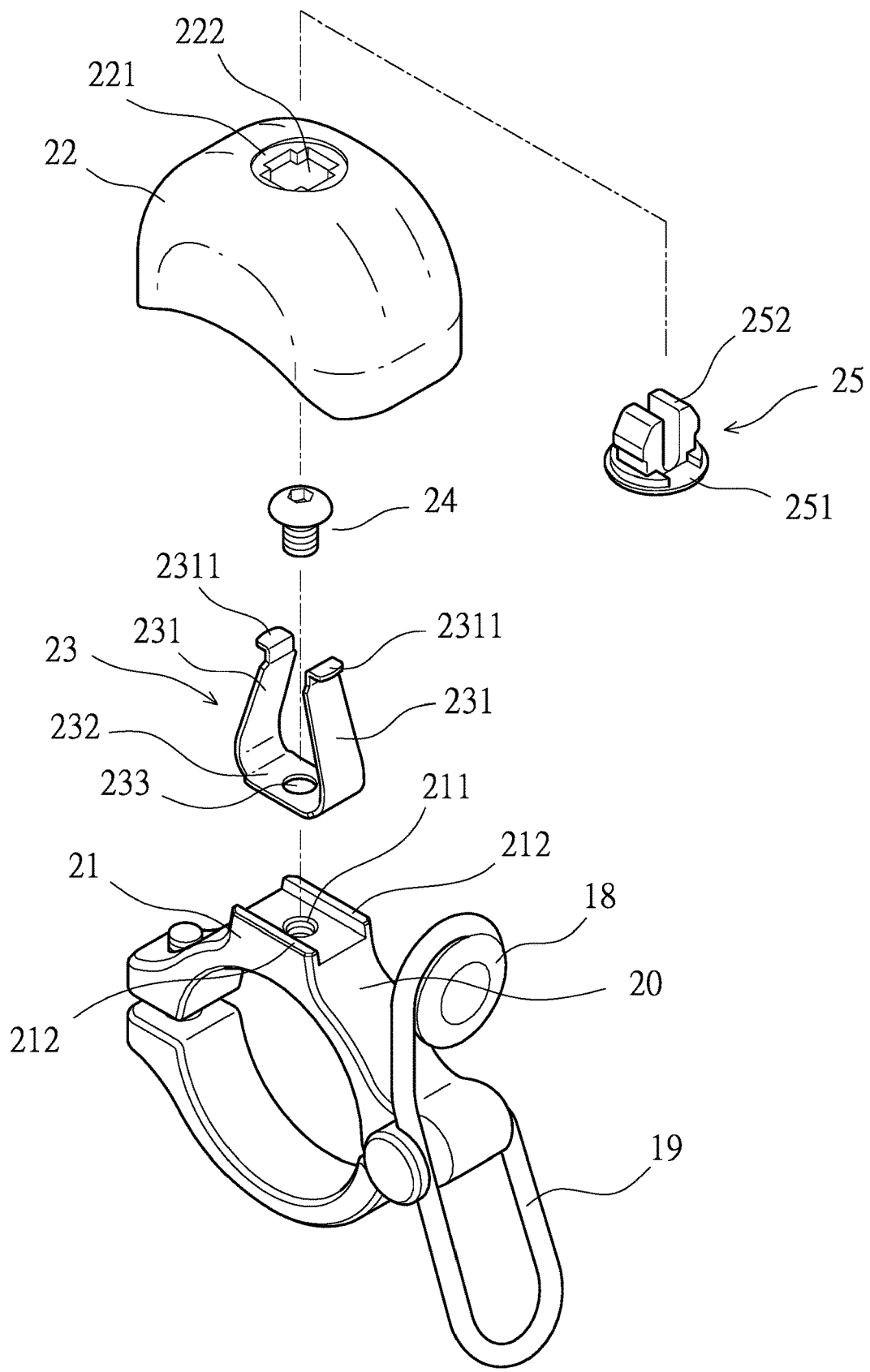
FIG. 2 is an exploded view according to a first embodiment of the present invention.
Figure 3:
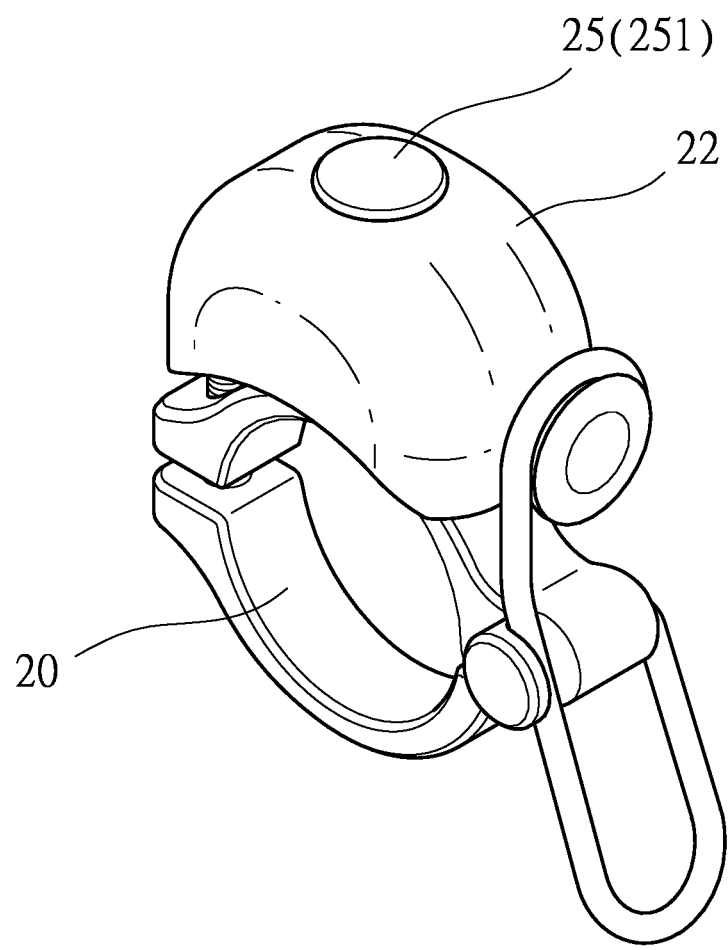
FIG. 3 is a perspective view according to the first embodiment of the present invention.
Figure 4:
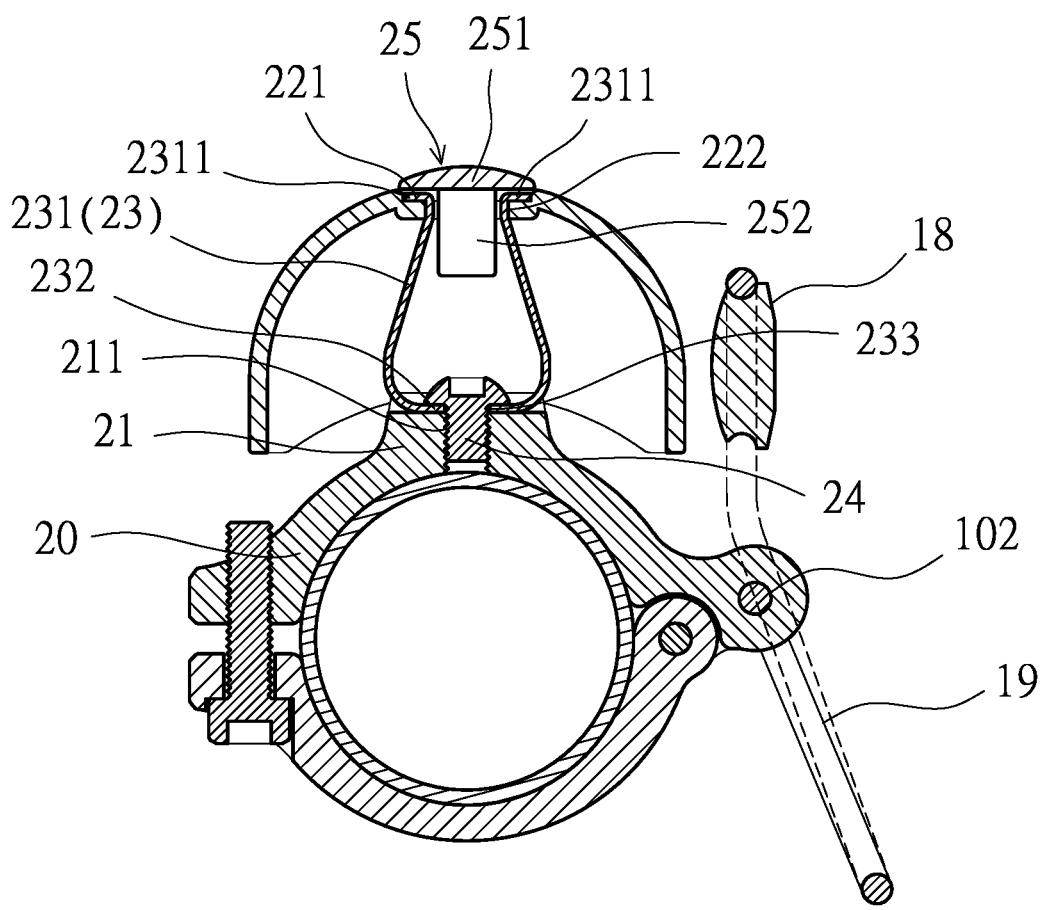
FIG. 4 is a side sectional view according to the first embodiment of the present invention.
Figure 5:
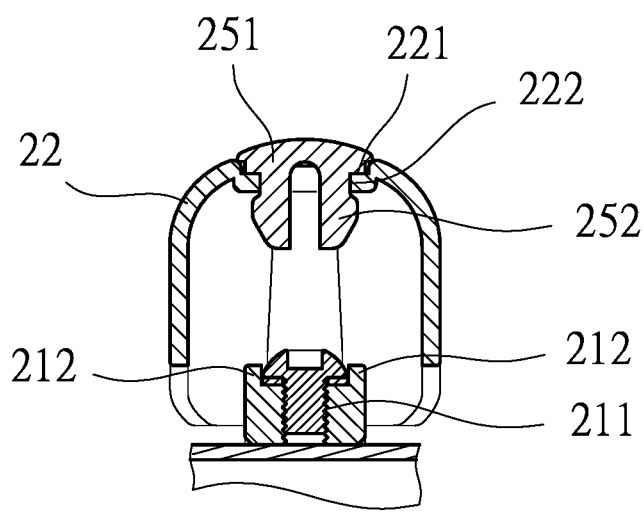
FIG. 5 is a front sectional view according to the first embodiment of the present invention.

Embodiments of the present invention will now be described, by way of example only, with reference to the accompanying drawings.

Referring to FIGS. 2 to 5, a bicycle bell according to a first embodiment of the present invention comprises a fixing seat 21 on a pipe clamp 20, a bell cover 22, an elastic support 23, a screw 24, a decorative plug 25, and a striker 18 having a spring 19. The fixing seat 21 has a screw hole 211. One side of the fixing seat 21 has a spring groove 102. Two opposite sides of the fixing seat 21 have raised walls 212, respectively. The top of the bell cover 22 has a recess portion 221. The recess portion 221 is formed with an engaging hole 222 passing through the bell cover 22. The elastic support 23 has two curved arms 231 and a horizontal section 232. The two curved arms 231 extend upward from two ends of the horizontal section 232. The two curved arms have engaging ends 2311 extending outwardly and laterally. The horizontal section 232 is formed with a perforation 233. The screw 24 is inserted through the perforation 233 and screwed into the screw hole 211, so that the horizontal section 232 of the elastic support 23 is secured to the fixing seat 21. The raised walls 212 lean against two sides of the horizontal section 232 to restrict the elastic support 23 from rotating. The engaging ends 2311 are inserted from the bottom of the bell cover 22 to be connected to the engaging hole 222 in a snap-on manner. The decorative plug 25 has a plug head 251 with two elastic hooks 252. The elastic hooks 252 are inserted from the top of the bell cover 22 to be engaged with the engaging hole 222 and interlaced with the engaging ends 2311. The plug head 251 is accommodated in the recess portion 221. The spring 19 is mounted in the spring groove 102 of the fixing seat 21. With the above-mentioned bicycle bell, the bell cover 22 is assembled to the fixing seat 21 through the elastic support 23. The elastic support 23 is a relatively flexible medium with poor energy conductivity, and only the small engaging ends 2311 are in contact with the bell cover 22, so that when the striker 18 is pulled by the thumb to bend the spring 19 to generate a return elastic force for the striker 18 to strike the bell cover 22 instantaneously, the vibration amplitude of the bell cover 22 is large, the energy loss is small, and the vibration is longer and louder.

The assembly and function of the first embodiment are described in detail below. Please refer to FIGS. 2 to 5. In the first embodiment, the elastic support 23 is locked to the fixing seat 21 with the screw 24. If the elastic support 23 is loosened by an external force, the raised walls 212 located at both sides of the elastic support 23 are configured to prevent the elastic support 23 from rotating. In this way, the elastic support 23 can be positioned firmly. The engaging ends 2311 are elastically compressed by an external force to approach each other, and the external force is removed after the engaging ends 2311 pass through the engaging hole 222 to be engaged with the engaging hole 222, so that the bell cover 22 and the elastic support 23 are assembled with a small contact area. In this way, due to the poor energy conductivity of the elastic support 23, the energy loss of the vibration of the bell cover 22 is small. In addition, the elasticity of the elastic support 23 enables the bell cover 22 to generate larger sound amplitude. When the bell cover 22 is struck by the striker 18, it can effectively prevent the loss of vibration energy. In other words, it can make the bell cover 22 vibrate longer so as to sound louder.

Figure 6:
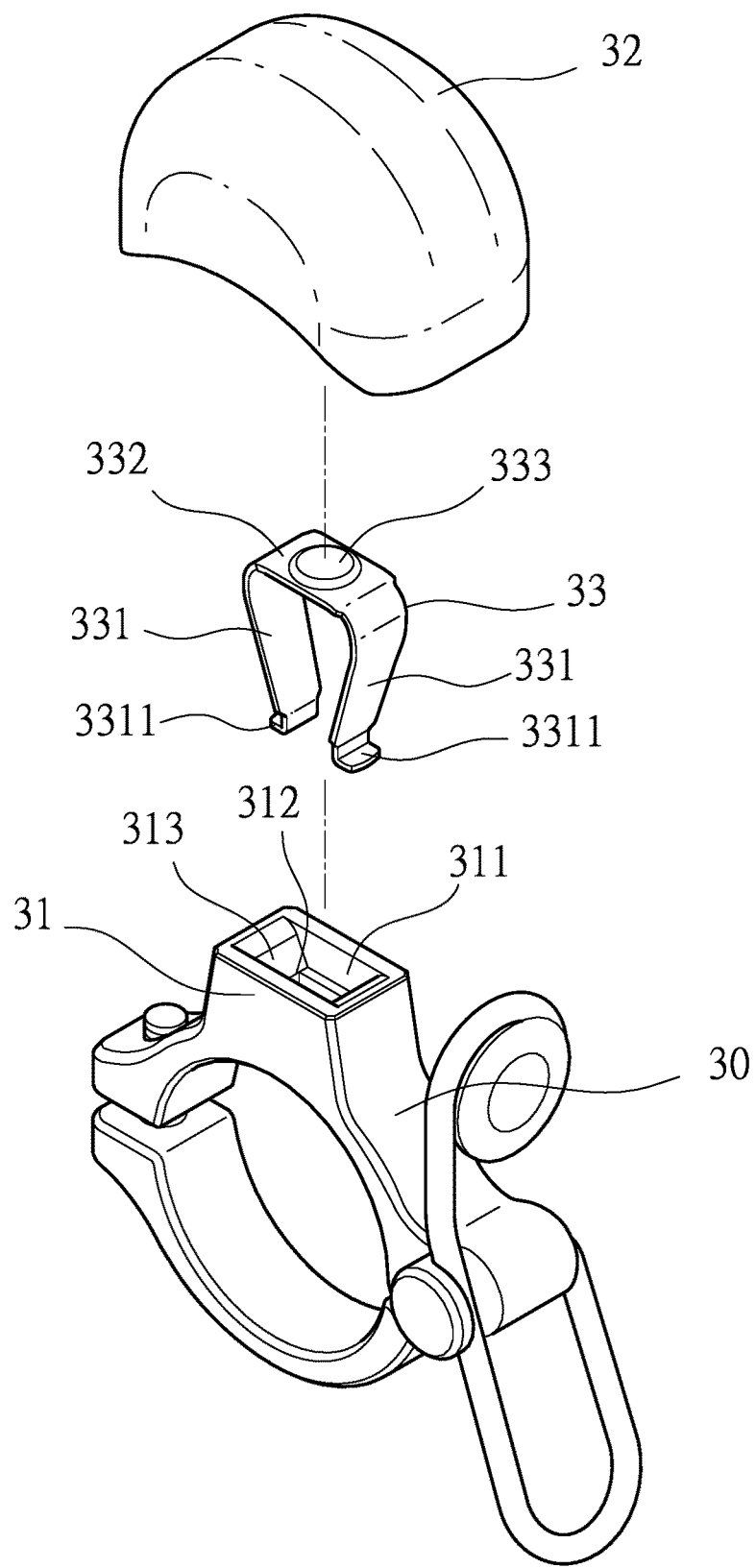
FIG. 6 is an exploded view according to a second embodiment of the present invention.
Figure 7:
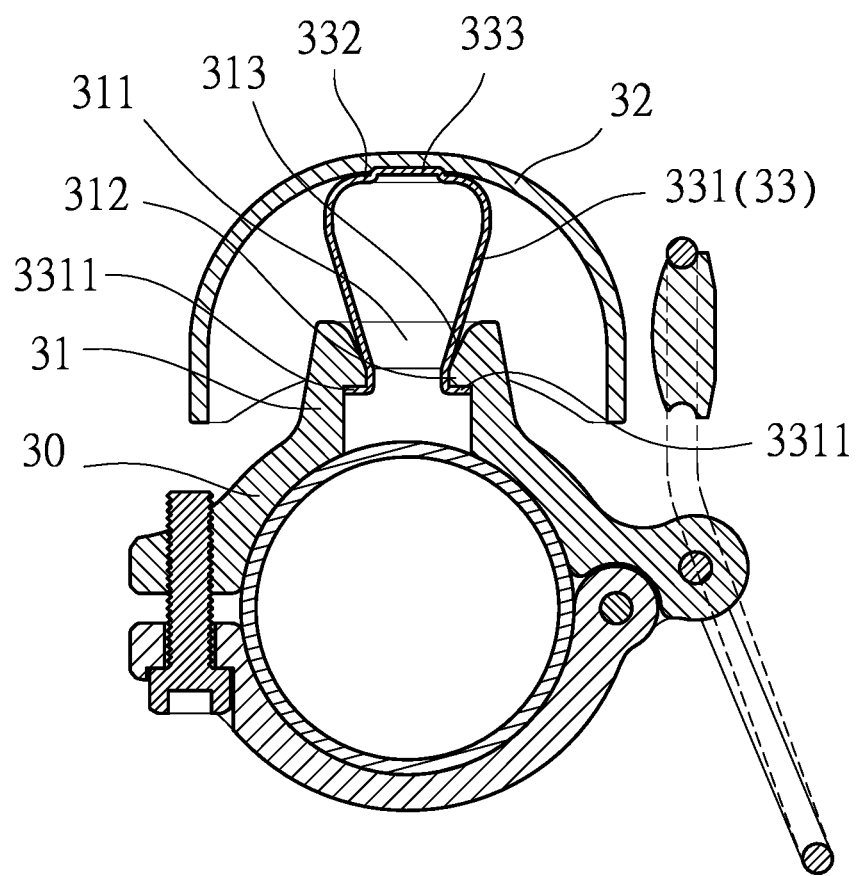
FIG. 7 is a side sectional view according to the second embodiment of the present invention.

According to the above technical means, referring to FIG. 6 and FIG. 7, a bicycle bell according to a second embodiment of the present invention comprises a fixing seat 31 on a pipe clamp 30, a bell cover 32, and an elastic support 33. The fixing seat 31 is concavely formed with an engaging groove 311. Two opposite side walls of the engaging groove 311 are provided with convex stops 312, respectively. A slope section 313 is formed between the edge of the engaging groove 311 and each of the convex stops 312. The elastic support 33 has two curved arms 331 and a horizontal section 332. The two curved arms 331 extend downward from two ends of the horizontal section 332. The two curved arms 331 have engaging ends 3311 extending outwardly and laterally. A protrusion 333 is provided on the horizontal section 332. The protrusion 333 is welded to the bottom of the bell cover 32. The engaging ends 3311 are inserted into the engaging groove 311 along the slope sections 313 to be engaged with the convex stops 312 in a snap-on manner. With the above-mentioned bicycle bell, the bell cover 22 is assembled to the fixing seat 21 through the elastic support 23. The elastic support 23 is a relatively flexible medium with poor energy conductivity, and only the small engaging ends 3311 are in contact with the bell cover 22, so that the vibration amplitude of the bell cover 22 is large, the energy loss is small, and the vibration is longer and louder.

The assembly and function of the first embodiment are described in detail below. Please refer to FIG. 6 and FIG. 7, in the second embodiment, the small protrusion 33 of the elastic support 33 is first welded to the bottom of the bell cover 32. When the engaging ends 331 are to be inserted through the engaging groove 311, the engaging ends 331 are pressed and guided by the slope sections 313 to move downward so that the engaging ends 331 are elastically compressed to approach each other. After the engaging ends 331 pass through the convex stops 312, the engaging ends 331 are hooked on the convex stops 312, so that the elastic support 33 and the fixing seat 31 are assembled with a small contact area. In this way, due to the poor energy conductivity of the elastic support 33, the energy loss of the vibration of the bell cover 32 is small. In addition, the elasticity of the elastic support 33 enables the bell cover 32 to generate larger sound amplitude. When the bell cover 32 is struck, it can effectively prevent the loss of vibration energy. In other words, it can make the bell cover 32 vibrate longer so as to sound louder.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bicycle bell, comprising a fixing seat on a pipe clamp, a bell cover, an elastic support, and a striker having a spring; the elastic support having two curved arms and a horizontal section, the two curved arms extending upward from two ends of the horizontal section, the two curved arms having engaging ends extending outwardly and laterally, the horizontal section being mounted to the fixing seat, the engaging ends being connected to the bell cover in a snap-on manner, wherein the fixing seat has a spring groove, the spring is mounted in the spring groove of the fixing seat, wherein the fixing seat has a screw hole, the horizontal section is formed with a perforation, and a screw is inserted through the perforation and screwed to the screw hole.

2. The bicycle bell as claimed in claim 1, wherein two opposite sides of the fixing seat have raised walls, and the raised walls lean against two sides of the horizontal section, respectively.

3. The bicycle bell as claimed in claim 1, wherein the bell cover has an engaging hole passing through the bell cover, and the engaging ends are inserted from a bottom of the bell cover to be engaged with the engaging hole.

4. The bicycle bell as claimed in claim 3, further comprising a decorative plug, the decorative plug having a plug head with two elastic hooks, a top of the bell cover having a recess portion, the engaging hole being located in the recess portion, the elastic hooks being inserted from the top of the bell cover to be engaged with the engaging hole and interlaced with the engaging ends, the plug head being accommodated in the recess portion.

* * * * *